(No Model.)
F. B. CHESBROUGH.
CARTRIDGE RELOADER.
No. 479,245.                    Patented July 19, 1892.
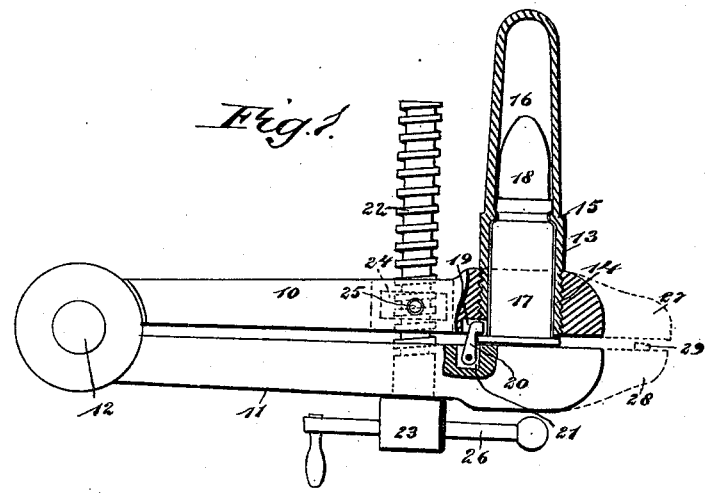
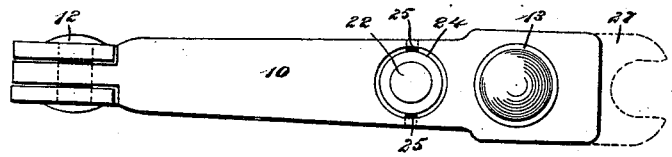
WITNESSES:
INVENTOR:
ATTORNEYS

United States Patent Office.

FREMONT B. CHESBROUGH, OF EMERSON, MICHIGAN.

CARTRIDGE-RELOADER.

SPECIFICATION forming part of Letters Patent No. 479,245, dated July 19, 1892.

Application filed December 22, 1891. Serial No. 415,837. (No model.)

*To all whom it may concern:*

Be it known that I, FREMONT B. CHESBROUGH, of Emerson, in the county of Chippewa and State of Michigan, have invented a new and Improved Cartridge-Reloader, of which the following is a full, clear, and exact description.

My invention relates to improvements in tools for reloading cartridges. With the usual lever-operated instruments it is a difficult matter to reload large cartridges, as it requires considerable power to properly compress the powder, swage the bullet, and crimp the shell around the base of the bullet.

The object of my invention is to produce a simple instrument which may be operated by a screw and in substantially the same manner as a vise, and by means of which a shell may be easily loaded and the shell and bullet properly shaped.

To this end my invention consists in a cartridge-reloader, the construction of which will be hereinafter described and claimed.

Reference is to be had to the accompanying drawings, forming a part of this specification, in which similar figures of reference indicate corresponding parts in both the views.

Figure 1 is a side elevation, partly in section, of the tool embodying my invention; and Fig. 2 is a plan view of the same.

The reloader is provided with two similar jaws 10 and 11, which are pivoted together at one end, as shown at 12, and the jaw 10 is provided with a transversely-threaded bore near its free end into which the tube 13 is screwed, the tube having the part next the jaw of substantially cylindrical shape, so that it will fit nicely upon the shell of a cartridge, and the tube at this point is screw-threaded, as shown at 14 in Fig. 1, so that it may be screwed into the bore of the jaw. At the point where the cylindrical portion of the tube terminates an annular rib 15 is produced on the inner wall of the tube, which rib by contacting with the open end of a shell is adapted to crimp the shell and force it snugly around the butt of the bullet. The upper portion 16 of the tube is closed at its outer end and tapers gradually, so that when forced upon a bullet it will properly swage the same. As before remarked, the shell 17 of the cartridge is adapted to fit snugly in the cylindrical portion of the tube and the bullet 18 fits snugly in the tapering portion of the tube, and the tapering part is long enough to receive any ordinary bullet. The inner face of the jaw 10 adjacent to the tube 13 is recessed, as shown at 19, and the tube is also recessed at this point, so that a hook 20, which is pivoted in a recess 21 of the opposite jaw 11, may swing into the recess 19 and engage the flange of the cartridge 17, and when the jaws are forced apart the hook will act as an extractor and pull the cartridge out of the tube 13. The jaws 10 and 11 are operated by means of a screw 22, which extends transversely through them, the screw having a suitable head 23 at one end to prevent it from being drawn through the jaw 11, and the screw is held to turn in a nut 24 in the jaw 10, which nut is pivoted on trunnions 25, and consequently the nut will tip so that the jaws may be opened wide enough to receive any ordinary cartridge.

A common form of handle 26 extends transversely through the head 23 of the screw and by means of the handle the screw is turned. The instrument is intended as a reloader; but, if desired, the jaw 10 may be prolonged, as shown in dotted lines at 27, the end being notched to receive a cartridge, and the opposite jaw 11 may be also prolonged, as shown at 28, and provided with a projection 29, adapted to force a cap or primer into the usual center aperture of the cartridge.

The operation of the tool is as follows: The jaws are opened wide enough to receive the cartridge, the shell of the cartridge is filled with powder, the bullet 18 is entered in the shell, and the cartridge is then thrust into the tube 13 and the jaws 10 and 11 forced together by means of the screw 22 and handle 26. It will thus be seen that the cartridge may be forced firmly into the tube and the converging or tapering part of the tube will swage the bullet and cause the powder to be properly compressed. By reversing the screw and forcing the jaws apart the hook 20 will extract the shell.

It will be understood that different tubes may be used having different internal diameters, and the instrument may thus be used for loading different sizes of cartridges. If desired, the jaw 10 may be secured in a fixed support and the instrument operated in the manner described.

Having thus fully described my invention, I claim as new and desire to secure by Letters Patent—

1. A cartridge-reloader comprising oppositely-arranged jaws, a tapering tube held in one of the jaws and shaped to fit a cartridge, and a screw extending transversely through the jaws, one of the jaws carrying a pivoted nut to receive the screw, substantially as described.

2. A cartridge-reloader comprising oppositely-arranged jaws, a detachable cartridge-receiving tube carried by one of the jaws and adapted to fit a cartridge, a nut pivoted in one of the jaws, a screw extending through one of the jaws and through the nut of the opposite jaw, and an extractor for the cartridge, substantially as described.

3. The combination, with the movable jaws, one of which is provided with a cartridge-receiving tube and has a recess adjacent to the tube, of a hook pivoted on one of the jaws and adapted to engage the flange of the cartridge, substantially as described.

FREMONT B. CHESBROUGH.

Witnesses:
ELNYESER M. NICHOLS,
WM. WALLACE.